United States Patent
Raja et al.

(10) Patent No.: US 10,640,617 B2
(45) Date of Patent: *May 5, 2020

(54) METHOD OF PREPARING A POLYMER DISPERSION AND POLYMER DISPERSIONS PREPARED THEREBY

(71) Applicant: SABIC Global Technologies B.V, Bergen op Zoom (NL)

(72) Inventors: Tanzeela Raja, Bergen op Zoom (NL); Viswanathan Kalyanaraman, Newburgh, IN (US); Liping Zheng, Shanghai (CN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 126 days.

This patent is subject to a terminal disclaimer.

(21) Appl. No.: 15/740,612

(22) PCT Filed: Jun. 23, 2016

(86) PCT No.: PCT/US2016/038919
§ 371 (c)(1),
(2) Date: Dec. 28, 2017

(87) PCT Pub. No.: WO2017/003809
PCT Pub. Date: Jan. 5, 2017

(65) Prior Publication Data
US 2018/0194903 A1 Jul. 12, 2018

Related U.S. Application Data

(60) Provisional application No. 62/186,615, filed on Jun. 30, 2015.

(51) Int. Cl.
| | |
|---|---|
| C08J 3/00 | (2006.01) |
| C08J 3/07 | (2006.01) |
| C08G 64/12 | (2006.01) |
| C08G 73/10 | (2006.01) |
| C09D 169/00 | (2006.01) |
| C09D 179/08 | (2006.01) |
| B01D 17/02 | (2006.01) |
| C08J 3/09 | (2006.01) |
| C08J 3/12 | (2006.01) |

(52) U.S. Cl.
CPC ............ *C08J 3/07* (2013.01); *B01D 17/02* (2013.01); *C08G 64/12* (2013.01); *C08G 73/1053* (2013.01); *C08G 73/1071* (2013.01); *C08J 3/093* (2013.01); *C08J 3/12* (2013.01); *C09D 169/00* (2013.01); *C09D 179/08* (2013.01); *C08J 2369/00* (2013.01); *C08J 2379/08* (2013.01)

(58) Field of Classification Search
CPC ....... C08J 3/07; C08J 3/093; C08J 3/12; C08J 2379/08; C08J 73/1071; C08G 64/12; C08G 73/1053; C08G 73/1071; C09D 169/00; C09D 179/08; B01D 17/02

USPC ........................................................ 523/339
See application file for complete search history.

(56) References Cited

U.S. PATENT DOCUMENTS

| | | | | |
|---|---|---|---|---|
| 3,981,839 | A * | 9/1976 | Asher | ................... C08G 63/79 524/457 |
| 6,169,130 | B1 * | 1/2001 | Bodmeier | ............ A61K 9/2893 523/223 |
| 6,528,611 | B2 | 3/2003 | Vodermayer et al. | |
| 7,192,638 | B2 | 3/2007 | Tomihashi et al. | |
| 10,294,329 | B2 * | 5/2019 | Kalyanaraman | ... C09D 179/085 |
| 10,465,049 | B2 * | 11/2019 | Kalyanaraman | ........... C08J 3/14 |
| 2011/0300381 | A1 | 12/2011 | Bergerat et al. | |
| 2012/0132655 | A1 | 5/2012 | Perillon et al. | |
| 2012/0264854 | A1 | 10/2012 | Courtois et al. | |
| 2013/0289175 | A1 * | 10/2013 | Liu | ..................... C09D 179/08 524/104 |
| 2014/0272430 | A1 * | 9/2014 | Kalayaraman | ......... C09D 5/027 428/435 |

(Continued)

FOREIGN PATENT DOCUMENTS

| | | |
|---|---|---|
| JP | 2013231098 | 11/2013 |
| JP | 5445587 | 3/2014 |

(Continued)

OTHER PUBLICATIONS

International Search Report for International Application No. PCT/US2016/038919; International Filing Date: Jun. 23, 2016; dated Oct. 4, 2016; 6 pages.

(Continued)

*Primary Examiner* — Hannah J Pak
(74) *Attorney, Agent, or Firm* — Cantor Colburn LLP

(57) ABSTRACT

Disclosed herein is a method of preparing a polymer dispersion including combining a first solution with a second solution to provide an emulsion, and removing the first solvent from the emulsion to provide a dispersion including a plurality of polymer particles. The first solution includes a first solvent, a polyetherimide, a polycarbonate, or a combination of at least one of the foregoing, and optionally a nonionic surfactant. The second solution includes an aqueous solvent, and optionally a nonionic surfactant. The polymer particles have an average particle size (D50) of less than or equal to 20 micrometers. Also described are polyetherimide dispersions including a plurality of polyetherimide particles, wherein at least 90% of the particles have a particle size less than or equal to 14 micrometers, a nonionic surfactant, and an aqueous carrier.

16 Claims, 3 Drawing Sheets

(56) References Cited

U.S. PATENT DOCUMENTS

| | | |
|---|---|---|
| 2018/0094105 A1 | 4/2018 | Defoort et al. |
| 2018/0186951 A1* | 7/2018 | Kalyanaraman ........... C08J 3/14 |
| 2018/0273699 A1* | 9/2018 | Kalyanaraman ........... C08J 3/14 |

FOREIGN PATENT DOCUMENTS

| | | |
|---|---|---|
| KR | 2014078738 | 6/2014 |
| WO | 2013106488 | 7/2013 |
| WO | 2016134224 A1 | 8/2016 |

OTHER PUBLICATIONS

Written Opinion of the International Searching Authority for International Application No. PCT/US2016/038919; International Filing Date Jun. 23, 2016; dated Oct. 4, 2016; 8 pages.

* cited by examiner

METHOD OF PREPARING A POLYMER DISPERSION AND POLYMER DISPERSIONS PREPARED THEREBY

CROSS-REFERENCE TO RELATED APPLICATIONS

This application is a National Stage application of PCT/US2016/038919, filed Jun. 23, 2016, which claims the benefit of U.S. Provisional Application No. 62/186,615, filed Jun. 30, 2015, both of which are incorporated by reference herein in their entirety.

BACKGROUND

Polyimides, in particular polyetherimides (PEI) are amorphous, transparent, high performance polymers having a glass transition temperature (Tg) of greater than 180° C. Polyetherimides further have high strength, toughness, heat resistance, and modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

Thermoplastic polymers such as polyetherimides (PEI) are commonly used as films as well as protective layers due to their excellent mechanical, dielectric, and high heat properties. These polymers are also used commonly as a tie layer in cookware. Currently, different methods are used to coat materials with these high performance polymers. For example, melt processes can be employed, where the articles are coated with molten polymer and later cooled. Melt processes disadvantageously involve significant capital investments and also provide poor wetting of the polymer melt to the article, producing voids in the surface of the coated article. An organic solvent based coating process is commonly used in the industry to form films and to make coatings. Disadvantages of this organic solvent based coating process are the release of volatile organic compounds, as well as high viscosity of the polymer solution.

There is an unmet need for a facile method to prepare water-dispersed formulations, which have lower volatile organic compound (VOC) emission, as well as reduced viscosity.

BRIEF DESCRIPTION

A method of preparing a polymer dispersion comprises combining a first solution comprising a polyetherimide, a polycarbonate, or a combination comprising at least one of the foregoing, and a first solvent with a second solution comprising a first amount of nonionic surfactant and an aqueous solvent to provide an emulsion, wherein the first solvent is immiscible with the aqueous solvent; and removing the first solvent from the emulsion to provide a dispersion comprising a plurality of polymer particles, wherein the polymer particles have an average particle size ($D_{50}$) of less than or equal to 20 micrometers, preferably less than or equal to 10 micrometers, more preferably less than or equal to 5 micrometers.

Another embodiment is a method of preparing a polymer dispersion, the method comprising mixing a first solution comprising a polyetherimide, a polycarbonate, or a combination comprising at least one of the foregoing, a nonionic surfactant, and a first solvent with a second solution comprising an aqueous solvent to provide an emulsion, wherein the first and second solvents are immiscible; and removing the first solvent from the emulsion to provide a dispersion comprising a plurality of polymer particles; wherein the polymer particles have an average particle size of less than or equal to 20 micrometers, preferably less than or equal to 10 micrometers, more preferably less than or equal to 5 micrometers.

Another embodiment is a polyetherimide, dispersion prepared by the above method.

A polyetherimide dispersion comprises a plurality of polyetherimide particles, wherein at least 90% of the particles have a particle size less than or equal to 14 micrometers; a nonionic surfactant; and an aqueous carrier.

Another embodiment is an article formed from the polyetherimide dispersion.

The above described and other features are exemplified by the following figures and detailed description.

BRIEF DESCRIPTION OF THE DRAWINGS

The following figures are exemplary embodiments.

DETAILED DESCRIPTION

Figure 1:
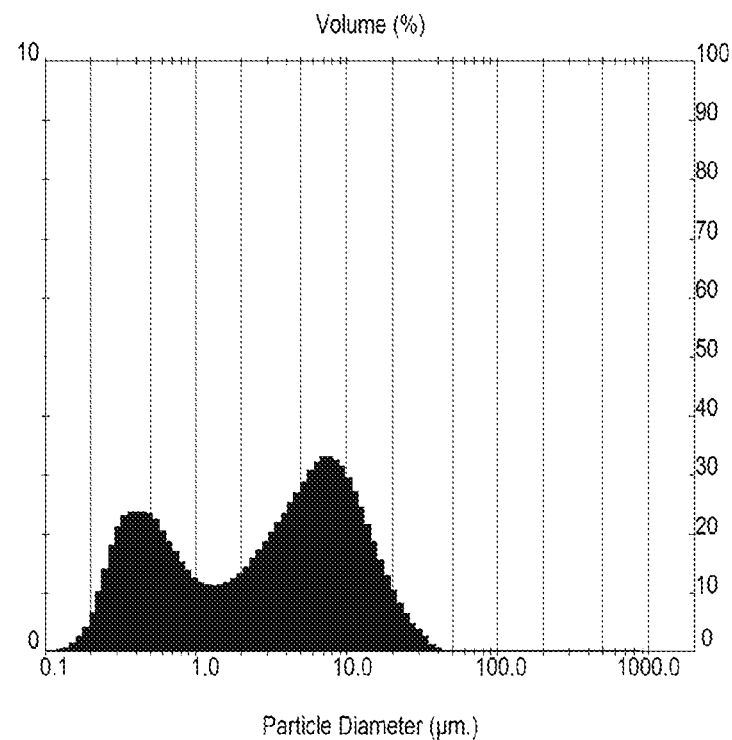
FIG. 1 shows the particle size distribution (PSD) for the aqueous polyetherimide (PEI) dispersion of Example 1.

Disclosed herein is a method for the preparation of a polymer dispersion, preferably a polyetherimide dispersion. The present inventors have discovered that aqueous dispersions of polymer (e.g., polyetherimide) particles can be prepared using non-ionic surfactants. Advantageously, the resulting dispersion contains negligible volatile organic compounds (VOC), providing a substantially VOC-free aqueous dispersion that can readily be used for coating applications. Furthermore, the polymer particles having a particle size distribution of 10 to 50 micrometers can be stabilized exclusively using a nonionic surfactant, which provides ease in manufacturing with no additional washing steps required to remove ionic surfactants, and further is a cost-effective approach. Thus, the present disclosure provides a route to aqueous polymer dispersions having small particle size and high solid content. The dispersions are also free of ions which can lead to elevated conductivity. Furthermore, the dispersions can advantageously be prepared in one step.

Accordingly, one aspect of the present disclosure is a method of preparing a polymer dispersion. The method comprises combining a first solution comprising a polyetherimide, a polycarbonate, or a combination comprising at least one of the foregoing, and a first solvent with a second solution comprising a first amount of nonionic surfactant and an aqueous solvent to provide an emulsion.

In some embodiments, the first solution comprises a polyetherimide. The polyetherimides can be prepared by the reaction of an aromatic bis(ether anhydride) of formula (1)

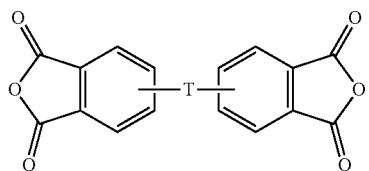
(1)

wherein T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (2)

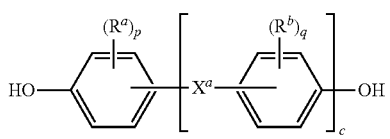
(2)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X_a$ can be a single bond, —O—, —S—, —S(O)—, —SO$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (2a)

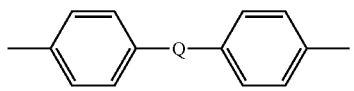
(2a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is derived from bisphenol A, such that Q in formula (2a) is 2,2-isopropylidene.

Illustrative examples of bis(anhydride)s include 3,3-bis[4-(3,4-dicarboxyphenoxy)phenyl]propane bisanhydride; 4,4'-bis(3,4-dicarboxyphenoxy)diphenyl ether bisanhydride; 4,4'-bis(3,4-dicarboxyphenoxy)diphenyl sulfide bisanhydride; 4,4'-bis(3,4-dicarboxyphenoxy)benzophenone hisanhydride; 4,4'-bis(3,4-dicarboxyphenoxy)diphenyl sulfone bisanhydride; 2,2-bis[4-(2,3-dicarboxyphenoxy)phenyl]propane bisanhydride; 4,4'-bis(2,3-dicarboxyphenoxy)diphenyl ether bisanhydride; 4,4'-bis(2,3-dicarboxyphenoxy)diphenyl sulfide bisanhydride; 4,4'-bis(2,3-dicarboxyphenoxy)benzophenone hisanhydride; 4,4'-bis(2,3-dicarboxyphenoxy)diphenyl sulfone bisanhydride; 4-(2,3-dicarboxyphenoxy)-4'-(3,4-dicarboxyphenoxy)diphenyl-2,2-propane bisanhydride; 4-(2,3-dicarboxyphenoxy)-4'-(3,4-dicarboxyphenoxy)diphenyl ether bisanhydride; 4-(2,3-dicarboxyphenoxy)-4'-(3,4-dicarboxyphenoxy)diphenyl sulfide bisanhydride; 4-(2,3-dicarboxyphenoxy)-4'-(3,4-dicarboxyphenoxy)benzophenone bisanhydride; and, 4-(2,3-dicarboxyphenoxy)-4'-(3,4-dicarboxyphenoxy)diphenyl sulfone bisanhydride, as well as various combinations thereof.

The bisanhydrides can be reacted with an organic diamine of formula (3)

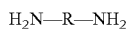
(3)

wherein R is a substituted or unsubstituted divalent $C_{1-20}$ hydrocarbon group, such as a substituted or unsubstituted $C_{6-20}$ aromatic hydrocarbon group or a halogenated derivative thereof, a substituted or unsubstituted, straight or branched chain, saturated or unsaturated $C_{2-20}$ alkylene group or a halogenated derivative thereof, a substituted or unsubstituted $C_{3-8}$ cycloalkylene group or halogenated derivative thereof, in particular a divalent group of formula (4)

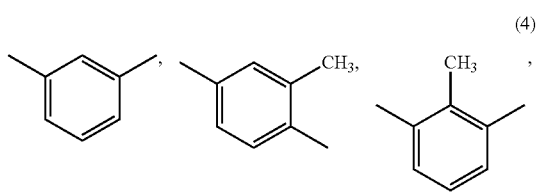
(4)

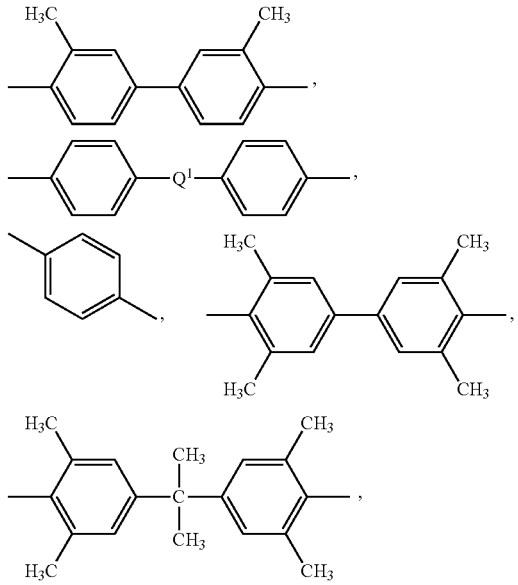

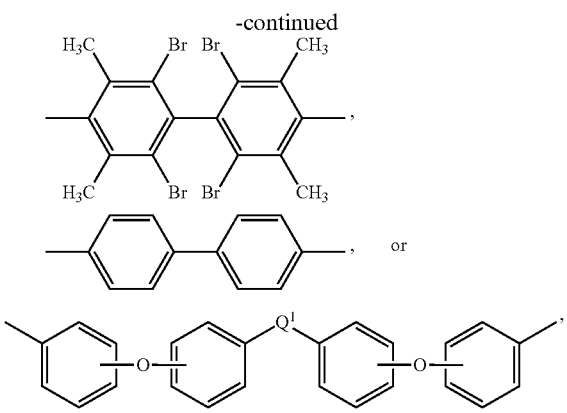

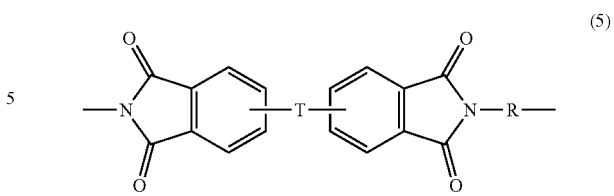

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or 4,4'-diphenylene sulfone. In some embodiments, no R groups contain sulfone groups. In another embodiment, at least 10 mol % of the R groups contain sulfone groups, for example 10 to 80 wt % of the R groups contain sulfone groups, in particular 4,4'-diphenylene sulfone, groups.

Examples of organic diamines include ethylenediamine, propylenediamine, trimethylenediamine, diethylenetriamine, methylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminothiene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, and bis(4-aminophenyl) ether. Combinations of these compounds can also be used. In some embodiments the organic diamine is m-phenylenediamine, p-phenylenediamine, 4,4'-sulfonyl dianiline, or a combination comprising one or more of the foregoing.

The polyetherimides comprise more than 1, for example 10 to 1000, or 10 to 500, structural units of formula (5)

wherein each T is the same or different, and is as described in formula (1), and each R is the same or different, and is as described in formula (4), preferably m-phenylene or p-phenylene.

In some embodiments, the polyetherimide is a copolymer that optionally comprises additional structural units that are not polyetherimide units, for example imide units of the formula

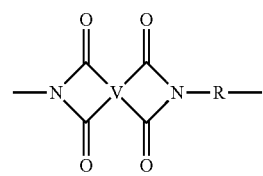

wherein R is as described in formula (1) and each is the same of different, and is a substituted or unsubstituted C$_{6-20}$ aromatic hydrocarbon group, for example a tetravalent linker of the formulas

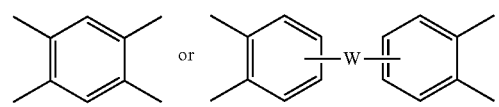

wherein W is a single bond, —S—, —C(O)—, —SO$_2$—, —SO—, or —C$_1$H$_{2y}$— wherein y is an integer from 1 to 5 or a halogenated derivative thereof (which includes perfluoroalkylene groups). These additional structural imide units preferably comprise less than 20 mole percent (mol %) of the total number of units, and more preferably can be present mounts of 0 to 10 mol % of the total number of units, or 0 to 5 mol % of the total number of units, or 0 to 2 mole % of the total number of units. In some embodiments, no additional imide units are present in the polyetherimide.

In some embodiments in formula (5), R is m-phenylene or p-phenylene and T is —O—Z—O— wherein Z is a divalent group of formula (2a). Alternatively, R is m-phenylene, or p-phenylene and T is —O—Z—O— wherein Z is a divalent group of formula (2a) and Q is 2,2-isopropylidene (i.e., Z is 4,4'-diphenylene isopropylidene).

In some embodiments, the first solution comprises a polycarbonate. "Polycarbonate" as used herein means a polymer or copolymer having repeating structural carbonate units of formula (6)

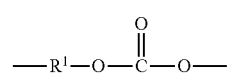

wherein at least 60 percent of the total number of R$^1$ groups are aromatic, or each R$^1$ contains at least one C$_{6-30}$ aromatic group. Specifically, each $R^1$ can be derived from a dihydroxy compound such as an aromatic dihydroxy compound of formula (7) or a bisphenol of formula (8).

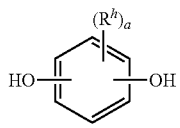
(7)

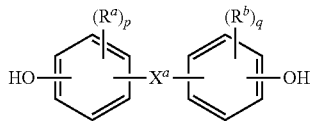
(8)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (8), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In some embodiments, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, U.S. 2014/0295363, and WO 2014/172923. Specific dihydroxy compounds include resorcinol, 2,2-bis(4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3 bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

In some embodiments, the polycarbonate is a copolycarbonate comprising bisphenol A carbonate units and 2-phenyl-3,3'-bis(4-hydroxyphenyl) phthalimidine carbonate units.

The first solution further comprises a first solvent. The first solvent can comprise dichloromethane, chloroform, dichloroethane or a combination comprising at least one of the foregoing. In some embodiments, the first solvent is preferably dichloromethane. Preferably, the first solvent is immiscible with the aqueous solvent.

The above-described first solution is combined with a second solution comprising a first amount of nonionic surfactant and an aqueous solvent to provide an emulsion. In some embodiments, the aqueous solvent is water.

In addition to the aqueous solvent the second solution comprises a nonionic surfactant. The nonionic surfactant can be a $C_{8-22}$ aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Examples of commercially available nonionic surfactants of this type are Tergitol 15-S-9 (a condensation product of $C_{1-15}$ linear secondary alcohol with 9 moles ethylene oxide), Tergitol 24-L-NMW (a condensation product of $C_{12-14}$ linear primary alcohol with 6 moles of ethylene oxide) with a narrow molecular weight distribution from Dow Chemical Company. This class of product also includes the Genapol brands of Clariant GmbH.

Other nonionic surfactants that can be used include polyethylene, polypropylene, and polybutylene oxide condensates of $C_{6-12}$ alkyl phenols, for example compounds having 4 to 25 motes of ethylene oxide per mole of $C_{6-12}$ alkylphenol, preferably 5 to 18 moles of ethylene oxide per mole of $C_{6-12}$, alkylphenol. Commercially available surfactants of this type include Igepal CO-630, Triton X-45, X-114, X-100 and X102, Tergitol TMN-10, Tergitol TMN-100X, and Tergitol TMN-6 polyethoxylated 2,6,8-trimethyl-nonylphenols or mixtures thereof) from Dow Chemical Corporation, and the Arkopal-N products from Hoechst AG.

Still others include the addition products of ethylene oxide with a hydrophobic base firmed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG.

The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide s added until the product contains from about 40 to about 80 wt % of polyoxyethylene and has a molecular weight of about 5000 to about 11,000 Daltons. Commercially available examples of this compound class are the Tetronic brands from BASF and the Genapol PN trademarks of Hoechst AG.

In some embodiments, the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol.

In some embodiments, an ionic surfactant (e.g., an anionic surfactant) can be included in combination with the nonionic surfactant. For example, when present, an anionic surfactant can be in an amount of 0.1 to 10 weight percent (wt. %), based on the weight of the nonionic surfactant, for example 1 to 10 wt. %, based on the weight of the nonionic surfactant.

The method further comprises removing the first solvent from the emulsion to provide a dispersion comprising a plurality of polymer particles. Removing the solvent can be by, for example, vacuum, by heating the emulsion above the boiling point of the organic solvent to form the dispersion, or a combination comprising at least one of the foregoing. In some embodiments, removing the solvent comprises adding the emulsion to water, for example spray-drying, spraying the emulsion into water, or dropwise addition of the emulsion into water, and removing the organic solvent by heating the dispersion above the boiling point of the organic solvent (e.g., distillation), by vacuum, or both. In some embodiments, the dispersion can have a solids content of greater than or equal to 11 wt. % of the polymer, preferably greater than or equal to 15 wt. % of the polymer. After removing the first solvent, the surfactant can be present in the dispersion in an amount of 0.001 to 10 wt. %. Within this range, the surfactant can be present in an amount of 0.05 to 10 wt. %, or 0.1 to 10 wt. %, based on the total weight of the dispersion. In some embodiments, the surfactant can be present in an amount of 0.05 to 5 wt. %, or 0.1 to 2 wt. %, based on the total weight of the dispersion.

The polymer particles can be polyetherimide particles, polycarbonate particles, or a combination comprising at least one of the foregoing. In some embodiments, prior to removal of the organic solvent, the polymer particles have an average particle size ($D_{50}$) of less than or equal to 20 micrometers, preferably less than or equal to 10 micrometers, more preferably less than or equal to 5 micrometers. In some embodiments, prior to removal of the organic solvent, the polymer particles have a particle size ($D_{90}$) of less than or equal to 90 micrometers, preferably less than or equal to 60 micrometers, more preferably less than or equal to 40 micrometers. In some embodiments, the polymer particles have a particle size ($D_{90}$) of less than or equal to 75 micrometers, preferably less than or equal to 50 micrometers, more preferably less than or equal to 30 micrometers. In some embodiments, the polymer particles have a particle size ($D_{90}$) of less than or equal to 50 micrometers, preferably less than or equal to 30 micrometers, more preferably less than or equal to 20 micrometers. In some embodiments, following removal of the organic solvent, the polymer particles can have a $D_{90}$ particle size of less than or equal to 14 micrometers, a $D_{50}$ particle size of less than or equal to 3.5 micrometers, a $D_{10}$ particle size of less than or equal to 0.5 micrometers, or a combination comprising at least one of the foregoing. Each of the aforementioned particle sizes are volume-based particle size diameters.

Another aspect of the present disclosure relates to a method of preparing a polymer dispersion, wherein the method comprises mixing a first solution comprising a polyetherimide, a polycarbonate, or a combination comprising at least one of the foregoing, a nonionic surfactant, and a first solvent, with a second solution comprising an aqueous solvent at neutral or alkaline pH to provide an emulsion. Thus, in this embodiment, the nonionic surfactant is included in the first solution. The polyetherimide, polycarbonate, first solvent, nonionic surfactant, and aqueous solvent can be as described above. The method further comprises removing the first solvent from the emulsion to provide a dispersion comprising a plurality of polymer particles. Removing the solvent can be by, for example, heating, purging with an inert gas, spraying into water followed by distillation, or a combination comprising at least one of the foregoing. In some embodiments, removing the solvent can optionally be performed at reduced pressure (i.e., under vacuum).

The polymer particles can have an average particle size of less than or equal to 20 micrometers, preferably less than or equal to 10 micrometers, more preferably less than or equal to 5 micrometers. In some embodiments, the polymer particles have $D_{90}$ particle size of 14 micrometers, a $D_{50}$ particle size of 2.5 micrometers, a $D_{10}$ particle size of 0.4 micrometers, or a combination comprising at least one of the foregoing. In some embodiments, the dispersion resulting from the present method has a solids content of 25 to 40 wt. % of the polymer.

In the above described methods, the mixing or combining can include agitating the first solution and the second solution, for example using a high shear mixer, to form the emulsion. In some embodiments, the agitating using a high shear mixer can be at 2,000 to 10,000 revolutions per minute (rpm), for example 3,000 to 10,000 rpm, for example 3,500 to 9,000 rpm, for example 4,000 to 9,000 rpm. In some embodiments, the emulsion can be achieved at a neutral pH, for example at a pH of 6 to 8, preferably at a pH of 6 to 7. In some embodiments, the emulsion can be formed at an alkaline pH, for example at a pH of 9 to 11.

In some embodiments, an ionic surfactant is excluded from the emulsion and the dispersion. Stated another way, in some embodiments, the emulsion and the dispersion can comprise less than 1 wt. %, for example less than 0.5 wt. %, for example less than 0.1 wt. %, for example less than 0.01 wt. % of an ionic surfactant, wherein weight percent is based on the weight of the polymer.

In some embodiments, the dispersion comprises less than or equal to 100 parts per million (ppm) of a volatile organic solvent, preferably less than or equal to 80 ppm of a volatile organic solvent, more preferably less than or equal to 75 ppm of a volatile organic solvent.

In some embodiments, the method further comprises isolating a powder comprising the polymer particles from the dispersion.

Another aspect of the present disclosure is a polyetherimide dispersion. The polyetherimide dispersion comprises a plurality of polyetherimide particles. At least 90% of the particles have a particle size that is less than or equal to 14 micrometers. The dispersion further comprises a nonionic surfactant, and an aqueous carrier. The nonionic surfactant can comprise a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol. In some embodiments, the aqueous carrier is water. In some embodiments, the dispersion comprises 1 to 90 wt. %, preferably 5 to 75 wt. %, more preferably 10 to 50 wt. % of the polyetherimide particles; 10 to 99 wt. %, preferably 25 to 95 wt. %, more preferably 70 to 90 wt. % of the aqueous carrier; and 0.001 to 10 wt. %, or 0.05 to 10 wt. %, or 0.05 to 5, or 0.05 to 1 wt. %, or 0.1 to 2 wt. % of the surfactant, wherein weight percent of each component is based on the total weight of the dispersion. In addition, the polyetherimide dispersions have less than 1 wt. %, or less than 0.1 wt. % of an organic solvent, based on the total weight of the dispersion, and preferably the dispersion is devoid of an organic solvent.

The dispersions can further comprise additives for using polyetherimide dispersions known in the art, with the provision that the additives) are selected so as to not significantly adversely affect the desired properties of the dispersions. Such additives include a particulate filler (such as glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. Additives can also include aqueous polymer dispersions or emulsions comprising polymers that are different from the polyetherimide and polycarbonate discussed above. Examples include poly(tetrafluoroethylene) (PTFE) emulsions, (meth)acrylic emulsions, and the like. In general, the additives are used in the amounts generally known to be effective. For example, the total amount of the additive composition (other than any filler) can be 0.001 to 10.0 wt %, or 0.01 to 5 wt %, each based on the total weight of the polymer dispersion.

For example, a combination of a heat stabilizer, mold release agent, and ultraviolet light stabilizer can be used. Pigments, surface effect agents, and nanosized fillers are also specifically contemplated, as such materials can be readily co-dispersed with the polymers, or pre-combined with the polymers. When present, the nanosized fillers can be present in an amount of 0.1 to 50 wt %, preferably 1 to 30 wt %, more preferably from 2 to 10 wt %, each based on the total weight of the polymer dispersion.

The dispersions can be manufactured by various methods according to general known techniques. For example, a method of manufacturing the polymer dispersions can include combining the components with agitation or stirring at a temperature and for a period of time effective to suspend the polymer particles to provide the dispersion. In an advantageous feature, it has been found that the dispersions are stable (i.e., resist settling) for a period of days or weeks at room temperature. In particular, dispersions having small particle size (e.g., 0.3 to 5 micrometers) show very slow settling, for example over a period of days or weeks. The settled particles can be easily redispersed (e.g., by agitation). The suspensions can accordingly be manufactured and readily shipped to the site of use.

Accordingly, an improved method for the preparation of a polymer dispersion, particularly, a polyetherimide dispersion, is provided herein. The method advantageously uses a nonionic surfactant which reduces or eliminates complications associated with the use of ionic surfactants, for example excessive foaming, and conductivity due to free ions. The aqueous polymer dispersions have small particle size and high solid content, and can advantageously be prepared in a single step.

The various aspects of the present disclosure are further illustrated by the following Examples, which are non-limiting.

EXAMPLES

Materials for the following examples are listed in Table 1

TABLE 1

| Component | Description | Source |
|---|---|---|
| PEI-1 | Polyetherimide made from the reaction of bisphenol A dianhydride with meta-phenylene diamine, having a glass transition temperature of 217° C., available as ULTEM 1000 | SABIC |
| PEI-2 | Polyetherimide made from the reaction of bisphenol A dianhydride with meta-phenylene diamine, having a glass transition temperature of 217° C., available as ULTEM 1010 | SABIC |
| BPA-co-PPPBP | 3,3-bis(4-hydroxyphenyl)-2-phenylisoindolin-1-one (BPA-co-PPPBP), including 33% PPPBP and having a glass transition temperature of 185° C. and a molecular weight of 23,000 Daltons. | SABIC |
| Tergitol TMN6 | Polyethylene glycol trimethylnonyl ether, CAS Reg. No. 60828-78-6, available as Tergitol TMN 6 | Dow Chemical Company |

TABLE 1-continued

| Component | Description | Source |
|---|---|---|
| Tergitol TMN10 | Polyethylene glycol trimethylnonyl ether, CAS . Reg. No 60828-78-6, , available as Tergitol TMN10 | Dow Chemical Company |
| SDBS | Sodium dodecyl benzene sulfonate, CAS Reg. No. 25155-30-0 | Sigma Aldrich |
| Tween 80 | Polyethylene glycol sorbitan monooleate, CAS Reg. No. 9005-65-6 | Sigma Aldrich |
| Triton X100 | 4-(1,1,3,3-Tetramethylbutyl)phenyl-polyethylene glycol, CAS Reg. No. 9002-93-1 | Sigma Aldrich |

Example 1

A first solution (S1) of PEI in dichloromethane (DCM) was prepared by adding 50 grams of PEI to 200 grams of DCM. A second solution (S2) was prepared by adding 2.8 grams of Tergitol TMN6 to 200 grams of water. The pH of S2 was adjusted to 9.8. S2 was added to S1 and the resulting mixture was homogenized under high shear at 6000 rpm for 3 minutes to form an emulsion. DCM was removed by adding the emulsion drop wise to a receiving container having 2.8 grams of TMN6 in 200 grams water under constant stirring at 80° C. Removal of DCM from aqueous dispersion was completed in one hour. The fraction of un-emulsified polymer was precipitated out and passed through 75 micrometer (μm) sieve to remove agglomerates formed with the beaker walls. The resulting dispersion contained PEI particles having a $D_{90}$ of 13.63 μm, a of 3.5 μm, and a $D_{10}$ of 0.35 μm. The particle sizes referred to herein are volume-based particle diameters. The particle size distribution (PSD) of the aqueous dispersions was measured using a low angle laser light scattering particle size distribution analyzer Mastersizer S—long bench with a measuring range of 0.05-3500 micrometers (μm).

The particle size distribution (PSD) is shown in FIG. 1. The resulting aqueous dispersion had a solids content of 15.5%.

Example 2

Figure 2:
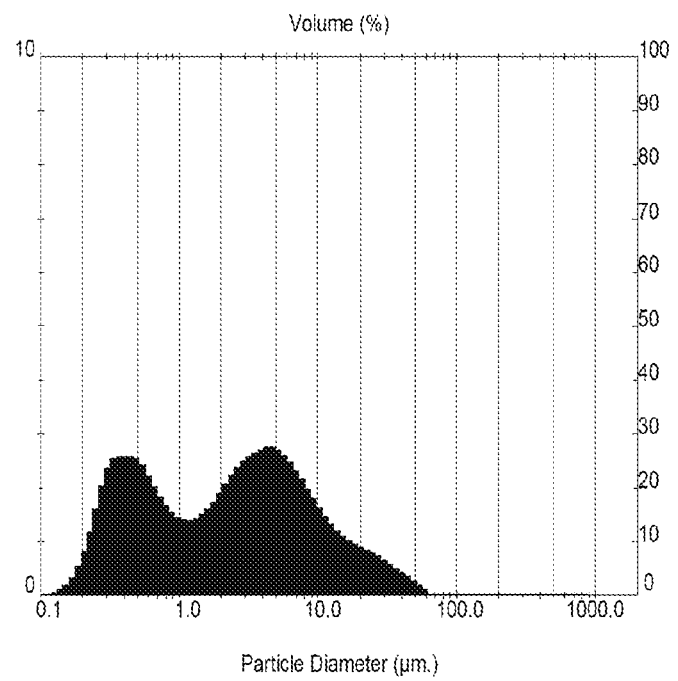
FIG. 2 shows the particle size distribution (PSD) for the aqueous polyetherimide dispersion of Example 2.

A first solution (S1) of PEI in dichloromethane (DCM) was prepared by adding 50 grams of PEI to 200 grams of DCM. A second solution (S2) was prepared by adding 2.8 grams of Tergitol TMN10 to 200 grams of water. The pH of S2 was adjusted to 9.8. S2 was added to S1, and the resulting mixture was homogenized under high shear at 6000 rpm for 3 minutes to form an emulsion. DCM was removed following the same procedure as described in Example 1. The final dispersion after DCM removal had a solids content of 15.5% and PEI particles having a distribution as follows: $D_{90}$ of 13.86 μm, a $D_{50}$ of 2.44 μm, and a $D_{10}$ of 0.33 μm. The PSD is shown in FIG. 2.

Example 3

A first solution (S1) was prepared by mixing solution of PEI (50 gram) in DCM (200 grams) and a solution of 2.8 grams of Tergitol TMN6 in 5 to 10 mL DCM. S1 was homogenized at 2000 rpm to completely mix the components of S1. A second solution (S2) comprises 200 grams of alkaline water having a pH of 10.9. S2 was added to S1, and the resulting mixture was homogenized under high shear at 9000 rpm for 3 minutes. The resulting emulsion included PEI particles having a $D_{90}$ of 41.05 μm, a $D_{50}$ of 19.55 μm, and a $D_{10}$ of 0.65 μm.

DCM was removed from the emulsion in a single step by heating at 60° C. while bubbling nitrogen gas through the dispersion for 30 min with constant stirring. The aqueous dispersion was allowed to concentrate during the DCM removal. After DCM removal and removal of agglomerates formed with the beaker wall, the final dispersion contained reduced-size PEI particles having a $D_{90}$ of 13.86 µm, a $D_{50}$ of 2.44 µm, and a $D_{10}$ of 0.33 µm. The final dispersion had a solids content of 25 to 40 wt. % PEI in water. The solids content was tunable based on the solvent removal time.

Figure 3:
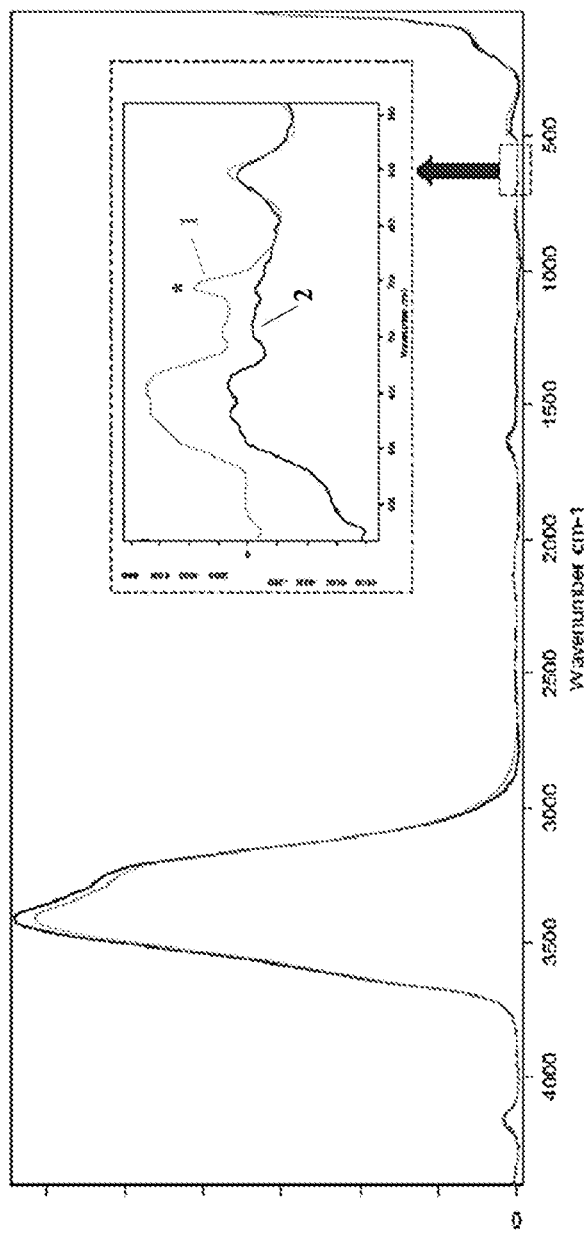
FIG. 3 shows Raman spectroscopy of a PEI dispersion after dichloromethane (DCM) removal.
Figure 4:
FIG. 4 shows gas chromatography a PEI dispersion after DCVI removal.

Following the removal of DCM, the amount of residual DCM n the aqueous dispersion was analyzed by gas chromatography and Raman spectroscopy, results of these analyses are provided in FIGS. 3 and 4. FIG. 3 shows the results from Raman spectroscopy. The sample of the dispersion (labeled as "2" in FIG. 3) was compared to a sample of the dispersion with 100 ppm DCM intentionally added (labeled as "1" in FIG. 3). The peak at 705 $cm^{-1}$ indicated by "*" indicates the presence of DCM. FIG. 3 shows that sample 2 containing 100 ppm of DCM clearly shows a peak at 705 $cm^{-1}$, whereas no discernible peak is observed for the sample of the dispersion. FIG. 4 shows the results from gas chromatography, where approximately 80 ppm of DCM were detected in the sample of the dispersion. The peak observed at 4.7 minutes corresponds to DCM detected in the head space of the same. Preferably, the aqueous PEI dispersion should contain less than or equal to 80 ppm of DCM, more preferably less than or equal to 80 ppm of DCM.

A comparison of the two methods of DCM removal from the aqueous dispersion is shown in Table 2. The advantage of the nitrogen-bubbling method over distillation is 50% reduced cycle time and higher solids content to achieve the same or less level of DCM in the final polymer particles.

TABLE 2

| DCM removal by distillation method (Examples 1-2) | DCM removal by nitrogen bubbling method (Example 3) |
|---|---|
| Cycle time: 60 minutes | Cycle time: 30 minutes |
| Temperature: 80° C. | Temperature: 60° C. |
| No nitrogen | Nitrogen bubbling |
| Dilution effect | Concentration effect |
| 2 step process | 1 step process |
| Final Solid %: 11.5% | Final Solid %: 25-40% |
| DCM in final powder: <100 ppm | DCM in final powder: 75-80 ppm |

Effect of pH on Emulsification

Another aspect of PEI aqueous dispersion formation using nonionic surfactants is the pH of the medium. The emulsification process of PEI in water did not occur at acidic or neutral pH. The PEI dissolved in DCM had a pH of 6.5. As pH of the systems was increased to alkaline (e.g., pH greater than or equal to 8), emulsion formation began. Table 3 shows the effect of pH on the emulsification process of PEI with Tergitol. TMN6 and TMN10 surfactants. Table 3 further shows the pH of the medium where complete emulsification was achieved.

TABLE 3

| pH | PEI emulsification by TMN6 (5-7 wt. %) | PEI emulsification by TMN6 (5-7 wt. %) | Remarks |
|---|---|---|---|
| | | | acidic pH |
| 2-6 | — | — | bilayer - no emulsification |
| | | | neutral pH |
| 7 | — | — | bilayer - no emulsification |
| | | | alkaline pH |
| 8 | — | — | slightly milky - not fully emulsified |
| 9 | X | X | complete milky - fully emulsified |
| 10 | X | X | complete milky - fully emulsified |
| 11 | X | X | complete milky - fully emulsified |

— no or incomplete emulsification
X complete emulsification

Effect of Polymer on Emulsification

The formation of an aqueous dispersion with PEI was further demonstrated using ULTEM 1010 ("PEI-2"), and a thermoplastic copolycarbonate of bisphenol A and 3,3-bis (4-hydroxyphenyl)-2-phenylisoindolin-1-one (BPA-co-PP-PBP) having a ratio of BPA:PPPBA of 67:33 using nonionic surfactants, shown as Examples 4-8 in Table 4.

For PEI-2, the process of emulsification was achieved in the same pH range as PE i.e., at a pH of 9-11. Lower pH did not show any emulsification even after application of high shear. Particle size was controlled by varying the amount of surfactant and the shear rate. After formation of the emulsion, the particle size distribution was measured and values are reported in Table 4. As shown in Table 4, larger particle sizes can be obtained.

The polycarbonate emulsification process began without any change in the pH. The pH of polycarbonate dissolved in DCM and TMN10 was 6.0-6.5. The addition of water was followed by applying shear, resulting in white emulsion formation. The pH of the emulsion was raised to 8 to complete the emulsification process. DCM was removed either by distillation or nitrogen bubbling, as explained above. PSD after removal of DCM is also reported in Table 4. The formation of aqueous polycarbonate dispersions was also demonstrated using an anionic surfactant sodium dodecyl benzene sulfonate (SDBS).

TABLE 4

| | Example 4 | Example 5 | Example 6 | Example 7 | Example 8 |
|---|---|---|---|---|---|
| Polymer | PEI-2 | PEI-2 | PEI-2 | BPA-co-PPPBP | BPA-co-PPPBP |
| Surfactant | TMN6, 5 wt. % | TMN10, 4 wt. % | TMN10, 5 wt. % | TMN10, 10 wt. % | SDBS, 0.4 wt. % |
| Emulsion pH | 9-11 | 9-11 | 9-11 | 6-8 | 6-8 |
| Shear (rpm) | 4000 | 4000 | 9000 | 9000 | 3500 |
| PSD before DCM removal (µm) | | | | | |
| $D_{90}$ | 97.87 | 82.95 | 31.76 | 74.67 | 24.34 |
| $D_{50}$ | 39.24 | 50.30 | 13.08 | 23.74 | 16.64 |
| $D_{10}$ | 07.32 | 18.48 | 00.44 | 06.19 | 02.15 |

Figure 5:
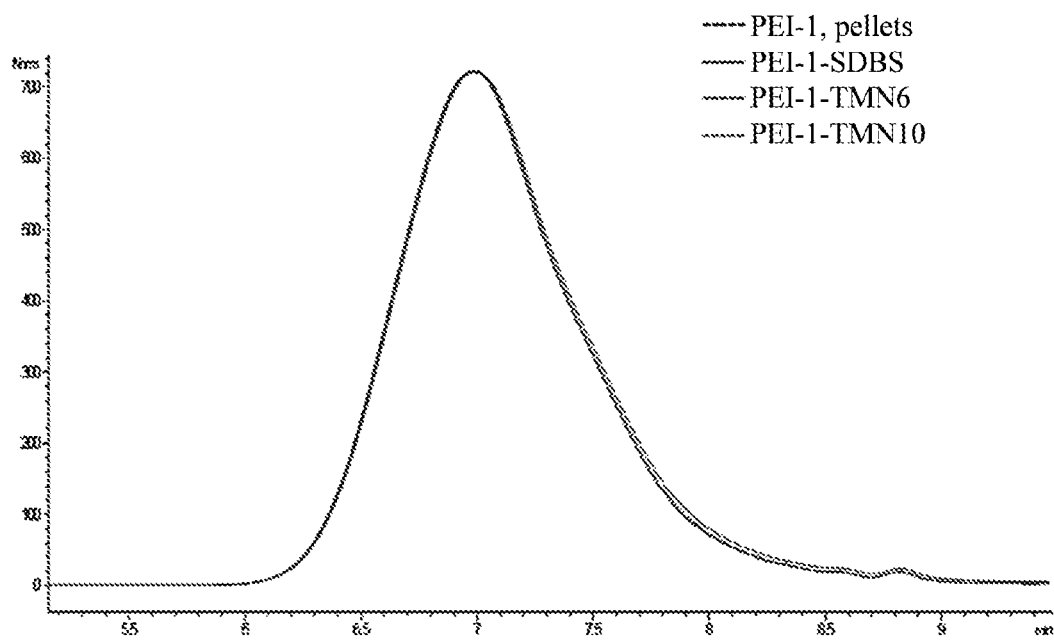
FIG. 5 shows gel permeation chromatography (GPC) of PEI powders prepared from ULTEM 1000 using various surfactants compared with polymer pellets of ULTEM 1000.
Figure 6:
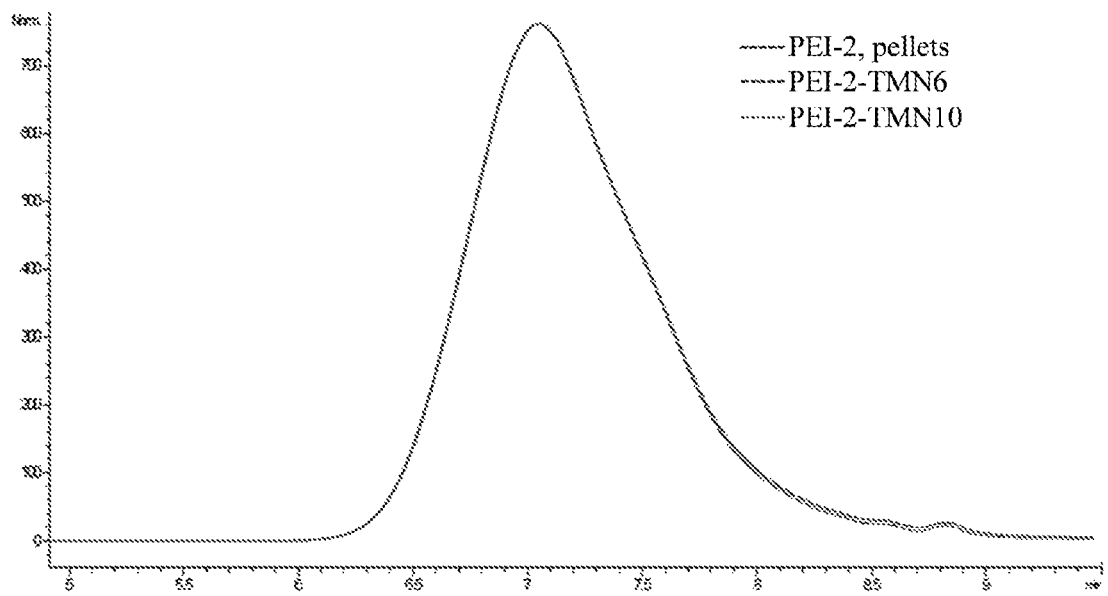
FIG. 6 shows GPC of PEI powders prepared from ULTEM 1010 using various surfactants compared with polymer pellets of ULTEM 1010.

The molecular weight of PEI powders prepared using Tergitol TMN6 and TMN10 surfactants was measured and compared with polymer pellets for PEI-1 and PEI-2. (FIG. 5 and FIG. 6 respectively). This demonstrates that aqueous dispersions having high loading of non-ionic surfactants TMN6 and TMN10 at alkaline pH had no adverse effect on the molecular weight and PDI of PEI-1 and PEI-2. For measuring molecular weight by gel permeation chromatography (GPC), the solid PEI particles were separated from water and dried at ambient temperature followed by vacuum drying at 80° C. for one hour. The number average molecular weight (Mn) and the weight average molecular weight (Mw) by GPC were determined relative to polystyrene standards. The molecular weight data is provided in Table 5.

TABLE 5

| Example | Polymer | Surfactant (wt. %) | Mw (Da) | Mn (Da) | PDI |
|---|---|---|---|---|---|
| Comparative Example 1 | PEI-1 (pellets) | — | 56,800 | 24,242 | 2.34 |
| Example 9 | PEI-1 (powder) | TMN6 (5 wt. %) | 57,503 | 23,085 | 2.49 |
| Example 10 | PEI-1 (powder) | TMN10 (5 wt. %) | 57,801 | 23,145 | 2.50 |
| Example 11 | PEI-1 (powder) | SDBS (0.6 wt. %) | 56,777 | 23,998 | 2.37 |
| Example 12 | PEI-1 (powder) | SDBS (0.4 wt. %) TMN6 (4 wt. %) | 55,499 | 22,395 | 2.48 |
| Example 13 | PEI-1 (powder) | SDBS (0.4 wt. %) TMN10 (4 wt. %) | 55,570 | 22,408 | 2.48 |
| Comparative Example 2 | PEI-2 (pellets) | — | 46,314 | 20,562 | 2.25 |
| Example 14 | PEI-2 (powder) | SDBS (0.4 wt. %) TMN6 (4 wt. %) | 46,450 | 19,686 | 2.36 |
| Example 15 | PEI-2 (powder) | SDBS (0.4 wt. %) TMN10 (4 wt. %) | 46,700 | 19,727 | 2.37 |

Effect of Surfactant

Other non-ionic surfactants, and mixed ionic/non-ionic surfactant systems were employed to make PEI aqueous dispersions (Table 6). Non-ionic surfactant systems include Tween 80, and Triton X100 and ionic surfactants include sodium dodecyl benzene sulfonate (SDBS) and sodium lauroyl sarcosinate (Sarkosyl). The ratio of ionic:nonionic surfactants in mixed-surfactants systems was <1 to 3-5 wt. %.

Unlike Tergitol TMN6 and TMN10, other non-ionic surfactants such as Tween 80 and Triton X100 emulsified PEI around neutral pH (6.5). Table 6 shows PEI aqueous dispersions prepared using nonionic surfactants other than Tergitol-based surfactants (Examples 16-20). The PSD values provided in Table 6 were measured prior to DCM removal.

TABLE 6

| | Example 16 | Example 17 | Example 18 | Example 19 | Example 20 |
|---|---|---|---|---|---|
| Polymer | PEI-1 | PEI-2 | PEI-2 | PEI-2 | PEI-2 |
| Surfactant | Tween 80, 5 wt % | Tween 80, 5 wt % | Triton X100, 5 wt % | SDBS 0.4 wt % Tween 80, 4 wt % | SDBS 0.4 wt % Triton X100, 5 wt % |
| Emulsion pH | 6.5-7.0 | 6.5-7.0 | 6.5-7.0 | 6.5-7.0 | 6.5-7.0 |
| Shear (rpm) | 4500 | 4500 | 4500 | 5000 | 5000 |
| PSD (μm) | | | | | |
| $D_{90}$ | 82.20 | 75.36 | 80.35 | 41.82 | 55.69 |
| $D_{50}$ | 26.20 | 29.13 | 27.51 | 19.86 | 28.71 |
| $D_{10}$ | 00.78 | 03.45 | 05.42 | 00.73 | 03.18 |

The various aspects of the present disclosure are further illustrated by the following embodiments, which are non-limiting.

Embodiment 1

A method of preparing a polymer dispersion, the method comprising combining a first solution comprising a polyetherimide a polycarbonate, or a combination comprising at least one of the foregoing, and a first solvent with a second solution comprising a first amount of nonionic surfactant and an aqueous solvent to provide an emulsion, wherein the first solvent is immiscible with the aqueous solvent; and removing the first solvent from the emulsion to provide a dispersion comprising a plurality of polymer particles, wherein the polymer particles have an average particle size ($D_{50}$) of less than or equal to 20 micrometers, preferably less than or equal to 10 micrometers, more preferably less than or equal to 5 micrometers.

Embodiment 2

The method of embodiment 1, wherein the polymer particles have a particle size ($D_{90}$) of less than or equal to 90 micrometers, preferably less than or equal to 60 micrometers, more preferably less than or equal to 40 micrometers.

Embodiment 3

The method of embodiment 1, wherein the polymer particles have a particle size ($D_{90}$) of less than or equal to 75 micrometers, preferably less than or equal to 50 micrometers, more preferably less than or equal to 30 micrometer.

Embodiment 4

The method of embodiment 1, wherein the polymer particles have a particle size ($D_{90}$) of less than or equal to 50 micrometers, preferably less than or equal to 30 micrometers, more preferably less than or equal to 20 micrometers.

Embodiment 5

The method of embodiment 1, wherein the polymer particles have a $D_{90}$ particle size of 14 micrometers, a $D_{50}$ particle size of 3.5 micrometers, a $D_{10}$ particle size of 0.5 micrometers, or a combination comprising at least one of the foregoing.

Embodiment 6

The method of any one or more of embodiments 1 to 5, wherein the dispersion has a solids content of greater than or equal to 15 weight percent of the polymer.

Embodiment 7

The method of any one or more of embodiments 1 to 6 where the removing comprises spray drying, distillation, spraying into water, or a combination comprising at least one of the foregoing, preferably distillation.

Embodiment 8

A method of preparing a polymer dispersion, the method comprising mixing a first solution comprising a polyetherimide, a polycarbonate, or a combination comprising at least one of the foregoing, a nonionic surfactant, and a first solvent with a second solution comprising an aqueous solvent to provide an emulsion, wherein the first and second solvents are immiscible; and removing the first solvent from the emulsion to provide a dispersion comprising a plurality of polymer particles; wherein the polymer particles have an average particle size of less than or equal to 20 micrometers, preferably less than or equal to 10 micrometers, more preferably less than or equal to 5 micrometers.

Embodiment 9

The method of embodiment 8, wherein the polymer particles have a $D_{90}$ particle size of 14 micrometers, a $D_{50}$ particle size of 2.5 micrometers, a $D_{10}$ particle size of 0.4 micrometers, or a combination comprising at least one of the foregoing.

Embodiment 10

The method of embodiment 8 or 9, wherein the dispersion has a solids content of 25 to 40 weight percent of the polymer.

Embodiment 11

The method of any one or more of embodiments 8 to 10, wherein the removing the solvent comprises heating, purging with an inert gas, or a combination comprising at least one of the foregoing.

Embodiment 12

The method of any one or more of one or more embodiments 1 to 11, wherein the mixing comprises agitating the first solution and the second solution using a high shear mixer to form the emulsion.

Embodiment 13

The method of any one or more of embodiments 1 to 12, wherein the first solution comprises a polyetherimide, and the polymer particles are polyetherimide particles.

Embodiment 14

The method of embodiment 13, wherein the polyetherimide comprises units of the formula

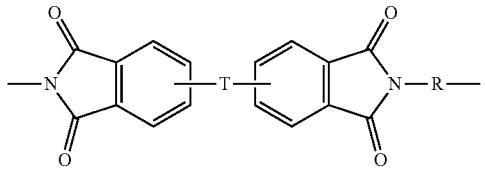

wherein R is a $C_{2-20}$ hydrocarbon group, T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 15

The method of claim 14, wherein R is a divalent group of the formula (4) herein, wherein $Q^1$ is —O—, —S—, —C(O)—, —SO$_2$—, —SO—, —C$_y$H$_{2y}$— and a halogenated derivative thereof; wherein y is an integer from 1 to 5, or —(C$_6$H$_{10}$)$_z$—; wherein z is an integer from 1 to 4; and Z is a group derived from a dihydroxy compound of the formula

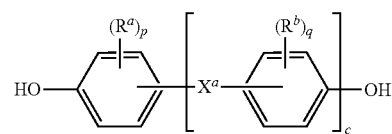

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —SO$_2$—, —C(O)—, or a $C_{1-18}$ organic bridging group.

Embodiment 16

The method of embodiments 14 or 15, wherein each R is independently meta-phenylene, para-phenylene, or a combination comprising at least one of the foregoing, and the Z is 4,4'-diphenylene isopropylidene.

Embodiment 17

The method of any one or more of embodiments 1 to 12, wherein the first solution comprises a polycarbonate, and the polymer particles are polycarbonate particles.

Embodiment 18

The method of embodiment 17, wherein the polycarbonate is a copolycarbonate comprising bisphenol A carbonate units and 2-phenyl-3,3'-bis(4-hydroxyphenyl) phthalimidine carbonate units.

Embodiment 19

The method of any one or more of embodiments 1 to 18, wherein the first solvent comprises dichloromethane, chloroform, dichloroethane or a combination comprising at least one of the foregoing, preferably dichloromethane; and the aqueous solvent is water.

Embodiment 20

The method of any one or more of embodiments 1 to 19, wherein the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol.

Embodiment 21

The method of any one or more of embodiments 1 to 20, wherein an ionic surfactant is excluded from the emulsion and the dispersion.

Embodiment 22

The method of any one or more of embodiments 1 to 21, further comprising isolating a powder comprising the polymer particles from the dispersion.

Embodiment 23

The method of any one or more of embodiments 1 to 22, wherein the dispersion comprises less than or equal to 100 ppm of a volatile organic solvent, preferably less than or equal to 80 ppm of a volatile organic solvent, more preferably less than or equal to 50 ppm of a volatile organic solvent, based on the total weight of the dispersion.

Embodiment 24

The method of any one or more of embodiments 1 to 23, wherein the polymer particles comprise less than or equal to 100 ppm of a volatile organic solvent, preferably less than or equal to 80 ppm of a volatile organic solvent, more preferably less than or equal to 50 ppm of a volatile organic solvent, based on the total weight of the polymer particles.

Embodiment 25

The method of any one or more of embodiments 1 to 24, wherein the emulsion has an alkaline pH, preferably a pH of 9 to 11.

Embodiment 26

The method of any one or more of embodiments 1 to 24, wherein the emulsion has a neutral pH, preferably a pH of 6 to 8, more preferably 6 to 7.

Embodiment 27

A polyetherimide dispersion prepared by the method of any one or more of embodiment 1 to 26.

Embodiment 28

A polyetherimide dispersion comprising, a plurality of polyetherimide particles, wherein at least 90% of the particles have a particle size less than or equal to 14 micrometers; a nonionic surfactant; and an aqueous carrier.

Embodiment 29

The polyetherimide dispersion of embodiment 28, comprising, based on the total weight of the dispersion, 1 to 90 wt. %, preferably 5 to 75 wt. %, more preferably 10 to 50 wt. % of the polyetherimide particles; 10 to 99 wt. %, preferably 25 to 95 wt. %, more preferably 70 to 90 wt. % of the aqueous carrier; and 0.001 to 10 wt. %, preferably 0.05 to 10 wt. %, more preferably 0.05 to 5 of the surfactant.

Embodiment 30

An article formed from the polyetherimide dispersion of any one or more of embodiments 27 to 29.

In general, the methods, compositions, and articles can alternatively comprise, consist of, or consist essentially of, any appropriate steps or components herein disclosed. The methods and compositions can additionally, or alternatively, be formulated so as to be devoid, or substantially free, of any components, materials, ingredients, adjuvants or species used in the prior art compositions or that are otherwise not necessary to the achievement of the function or objectives of the present invention.

The terms "a" and "an" and "the" as used herein do not denote a limitation of quantity, and are to be construed to cover both the singular and the plural, unless otherwise indicated herein or clearly contradicted by context. "Or" means "and/or" unless clearly indicated otherwise. All ranges disclosed herein are inclusive of the endpoints, and the endpoints are independently combinable with each other. "Combination" is inclusive of blends, mixtures, alloys, reaction products, and the like.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl), "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" as used herein means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkyne (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All references are incorporated herein by reference.

While particular embodiments have been described, alternatives, modifications, variations, improvements, and substantial equivalents that are or can be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of preparing a dispersion comprising a plurality of polymer particles, the method comprising
combining a first solution comprising a polyetherimide, a polycarbonate, or a combination thereof, and a first solvent with a second solution comprising a first amount of a nonionic surfactant and an aqueous solvent to provide an emulsion, wherein the first solvent is immiscible with the aqueous solvent; and
removing the first solvent from the emulsion to provide a dispersion comprising a plurality of polymer particles comprising the polyetherimide, the polycarbonate, or the combination thereof,
wherein the polymer particles have an average particle size (D50) of less than or equal to 20 micrometers;
wherein the polycarbonate has repeating structural carbonate units of the formula

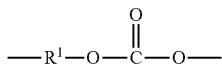

wherein at least 60 percent of the total number of $R^1$ groups are aromatic; and wherein the polyetherimide comprises units of the following formula

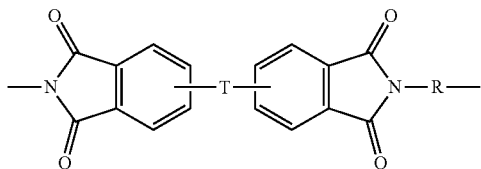

wherein
R is a $C_{2-20}$ hydrocarbon group,
T is —O— or a group of the formula —O—Z—O— wherein the divalent bonds of the —O— or the O—Z—O— group are in the 3,3', 3,4', 4,3', or the 4,4' positions, and
Z is an aromatic $C_{6-24}$ monocyclic or polycyclic group optionally substituted with 1 to 6 $C_{1-8}$ alkyl groups, 1-8 halogen atoms, or a combination thereof.

2. The method of claim 1, wherein the dispersion has a solids content of greater than or equal to 15 weight percent of the polyetherimide, the polycarbonate, or the combination thereof.

3. The method of claim 1, wherein the removing comprises distillation, placing under vacuum, spraying into water, or a combination thereof.

4. A method of preparing a dispersion comprising a plurality of polymer particles, the method comprising
combining a first solution comprising a polyetherimide, a polycarbonate, or a combination thereof, a nonionic surfactant, and a first solvent with a second solution comprising an aqueous solvent to provide an emulsion, wherein the first and second solvents are immiscible; and
removing the first solvent from the emulsion to provide a dispersion comprising a plurality of polymer particles comprising the polyetherimide, the polycarbonate, or the combination thereof;
wherein the polymer particles have an average particle size (D50) of less than or equal to 20 micrometers;
wherein the polycarbonate has repeating structural carbonate units of the formula

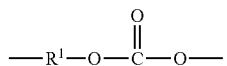

wherein at least 60 percent of the total number of $R^1$ groups are aromatic; and
wherein the polyetherimide comprises units of the following formula

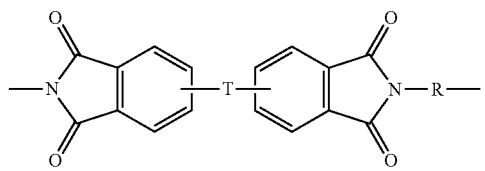

wherein
R is a $C_{2-20}$ hydrocarbon group,
T is —O— or a group of the formula —O—Z—O— wherein the divalent bonds of the —O— or the O—Z—O— group are in the 3,3', 3,4', 4,3', or the 4,4' positions, and
Z is an aromatic $C_{6-24}$ monocyclic or polycyclic group optionally substituted with 1 to 6 $C_{1-8}$ alkyl groups, 1-8 halogen atoms, or a combination thereof.

5. The method of claim 4, wherein the dispersion has a solids content of 25 to 40 weight percent of the polyetherimide, the polycarbonate, or the combination thereof.

6. The method of claim 4, wherein the removing comprises heating, purging with an inert gas, or a combination thereof.

7. The method of claim 1, wherein the first solution comprises the polyetherimide, and the polymer particles are polyetherimide particles.

8. The method of claim 1, wherein
R is a divalent group of the following formula

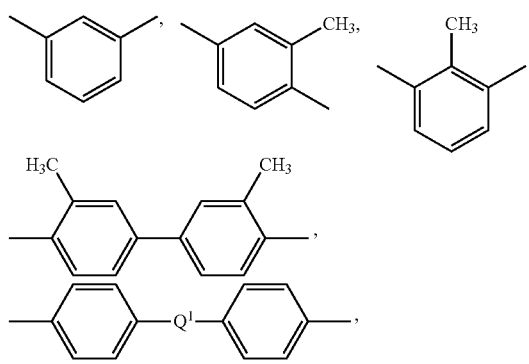

-continued

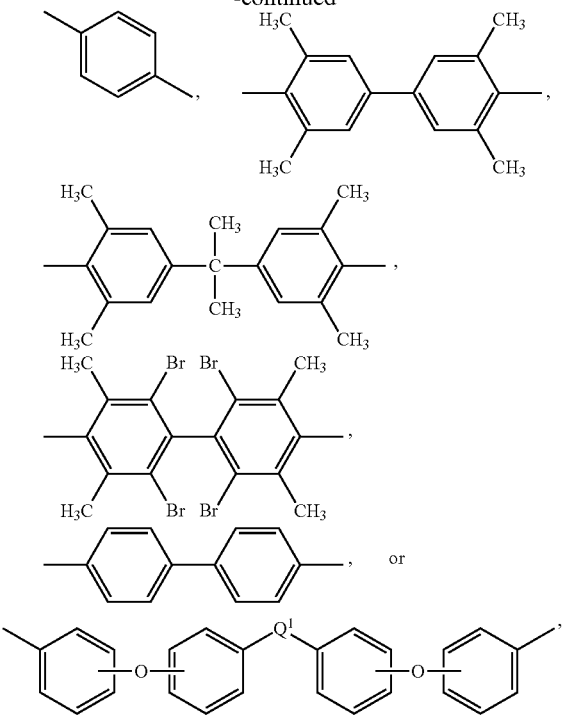

wherein $Q^1$ is —O—, —S—, —C(O)—, —SO2-, —SO—, —C$_y$H$_{2y}$— and a halogenated derivative thereof;
wherein y is an integer from 1 to 5, or —(C$_6$H$_{10}$)$_z$—;
wherein z is an integer from 1 to 4; and Z is a group derived from a dihydroxy compound of the following formula

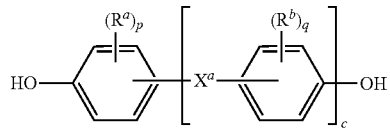

wherein $R^a$ and $R^b$ are each independently a halogen atom or a monovalent $C_{1-6}$ alkyl group;

p and q are each independently integers of 0 to 4;

c is 0 to 4; and $X^a$ is a single bond, —O—, —S—, —S(O)—, —SO$_2$—, —C(O)—, or a $C_{1-18}$ organic bridging group.

9. The method of claim 1, wherein each R is independently meta-phenylene, para-phenylene, or a combination thereof, and the Z is 4,4'-diphenylene isopropylidene.

10. The method of claim 1, wherein the first solution comprises the polycarbonate, and the polymer particles are polycarbonate particles.

11. The method of claim 10, wherein the polycarbonate is a copolycarbonate comprising bisphenol A carbonate units and 2-phenyl-3,3'-bis(4-hydroxyphenyl) phthalimidine carbonate units.

12. The method of claim 1, wherein the first solvent comprises dichloromethane, chloroform, dichloroethane or a combination thereof; and the aqueous solvent is water.

13. The method of claim 1, wherein the nonionic surfactant is a $C_{6-12}$ alkyl phenol having 4 to 25 moles of ethylene oxide per mole of $C_{6-12}$ alkylphenol.

14. The method of claim 1, wherein the method further comprises isolating a powder comprising the polymer particles from the dispersion.

15. The method of claim 1, wherein the dispersion comprises less than or equal to 100 ppm of a volatile organic solvent.

16. The method of claim 1, wherein the polymer particles comprise less than or equal to 100 ppm of a volatile organic solvent, based on the total weight of the polymer particles.

* * * * *